(12) United States Patent
Navarro Zavala et al.

(10) Patent No.: US 9,937,859 B2
(45) Date of Patent: Apr. 10, 2018

(54) VEHICLE PROXIMITY INDICATOR

(71) Applicant: Ford Global Technologies, LLC, Dearborn, MI (US)

(72) Inventors: Carlos Gerardo Navarro Zavala, Mexico City (MX); Jorge Romero Sanchez, Naucalpan (MX)

(73) Assignee: Ford Global Technologies, LLC, Dearborn, MI (US)

(*) Notice: Subject to any disclaimer, the term of this patent is extended or adjusted under 35 U.S.C. 154(b) by 29 days.

(21) Appl. No.: 14/994,413

(22) Filed: Jan. 13, 2016

(65) Prior Publication Data
US 2017/0197550 A1 Jul. 13, 2017

(51) Int. Cl.
| B60Q 1/00 | (2006.01) |
| B60Q 9/00 | (2006.01) |
| B60Q 1/30 | (2006.01) |
| G08G 1/09 | (2006.01) |
| G03B 21/00 | (2006.01) |

(52) U.S. Cl.
CPC ............ B60Q 9/008 (2013.01); B60Q 1/302 (2013.01)

(58) Field of Classification Search
CPC ............................. B60Q 9/008; B60Q 1/302
USPC ......................................................... 340/435
See application file for complete search history.

(56) References Cited

U.S. PATENT DOCUMENTS

| 6,204,754 | B1 | 3/2001 | Berstis | |
| 7,375,621 | B1 * | 5/2008 | Hines | B60Q 9/005 |
| | | | | 340/435 |
| 7,573,402 | B2 | 8/2009 | Herbert et al. | |
| 2004/0041983 | A1 * | 3/2004 | Bleiner | B60Q 1/52 |
| | | | | 353/13 |
| 2008/0080203 | A1 * | 4/2008 | Neufeglise | B60Q 1/302 |
| | | | | 362/540 |
| 2012/0044090 | A1 * | 2/2012 | Kahler | B60Q 1/50 |
| | | | | 340/905 |

(Continued)

FOREIGN PATENT DOCUMENTS

| CN | 1796935 A | 7/2006 |
| DE | 19749439 A1 | 5/1999 |

(Continued)

OTHER PUBLICATIONS

Search Report dated Feb. 16, 2017 for U.K. Patent Application No. GB 1700471.4.

*Primary Examiner* — Jack K Wang
(74) *Attorney, Agent, or Firm* — James P. Muraff; Neal, Gerber & Eisenberg LLP

(57) ABSTRACT

Embodiments include a vehicle comprising an end facing an external object, at least one vehicle light positioned adjacent to the end and projecting a light pattern onto the object, a window adjacent to the end, and at least one proximity indicator coupled to the window at a predetermined position corresponding to an expected location of the light pattern on the object when the end is located a predetermined distance from the object. The proximity indicator can be removably adhered to the window. The light pattern can be visible through the window from a vehicle interior. In some embodiments, the object is positioned adjacent to a rear end of the vehicle and the at least one vehicle light is a rear vehicle light. In other embodiments, the object is positioned adjacent to a front end of the vehicle and the at least one vehicle light is a front vehicle light.

20 Claims, 9 Drawing Sheets

(56) References Cited

U.S. PATENT DOCUMENTS

2013/0037339 A1    2/2013  Hickox
2014/0055252 A1*  2/2014  Ascencio ................. B60Q 1/50
                                                        340/425.5

FOREIGN PATENT DOCUMENTS

| FR | 2208108 A2 | 6/1974 |
| FR | 2923777 A1 | 5/2009 |
| JP | H05254378 A | 10/1993 |
| JP | 2005310609 A | 11/2005 |
| WO | WO-2007087757 A1 | 8/2007 |
| WO | WO-2013151449 A1 | 10/2013 |

* cited by examiner

VEHICLE PROXIMITY INDICATOR

TECHNICAL FIELD

This application generally relates to proximity detection in a vehicle and more specifically to providing a visual indicator when the vehicle is a desired distance from an object.

BACKGROUND

Currently, there are a number of different parking guidance systems for guiding a driver while parking a vehicle. For example, some vehicles include an onboard proximity detection system that audibly warns the driver, using short "beeps" or other sounds, as the vehicle approaches a wall or other object behind the vehicle. In some cases, the warning sounds change, for example, in frequency and/or pitch, in order to indicate the amount of space remaining between the vehicle and the object and/or to convey a stronger or more urgent warning as the remaining space decreases. However, one drawback of such proximity detection systems is that the warning sounds can be difficult to translate into a distance in terms of feet or inches. Also, the proximity detection equipment may not be available in certain (e.g., economy-level) vehicles.

Some vehicles include one or more cameras for capturing video of a rear (or front) of the vehicle and a display within the vehicle for displaying the captured video in real time. Using the live video feed, the driver can directly observe the space behind (or ahead of) the vehicle while moving the vehicle into a parking spot. However, one drawback of such video-based parking systems is the need for expensive equipment (e.g., camera(s), display screen, etc.) and complex circuitry, features that are not available in certain vehicles and/or are not feasible at certain price points.

Other existing parking systems include laser beams that are installed at predetermined points on the vehicle and projected onto either a forward or rearward surface adjacent to a parking spot. A position of the laser beams on the surface can indicate the distance between the vehicle and the surface and can help guide the driver into the spot. For example, in one system, a vertical line is applied to the rearward surface, and alignment of the laser beams on the vertical line indicates that the vehicle is properly positioned within the parking spot. However, such laser-based systems have several drawbacks. For example, laser beams can be extremely difficult to observe in bright sunlight conditions, and their performance may be affected by temperature changes and other external factors. Also, implementation of such systems can be costly and complex.

Accordingly, there still exists a need for an effective parking guidance system that can help drivers ascertain a distance between a vehicle and a wall or other object within a path of the vehicle and does not require expensive equipment or complex installation.

SUMMARY

The invention is intended to solve the above-noted problems by providing techniques for indicating, on a vehicle window, a distance between the vehicle and an object within a path of the vehicle as the driver maneuvers the vehicle into a parking position adjacent to the object. The distance is indicated by the relative positioning of (1) a light pattern projected onto the object by one or more vehicle lights, the light pattern being visible through a front and/or rear window of the vehicle, and (2) one or more vehicle proximity indicators affixed to a predetermined position on the front and/or rear window. The predetermined position is selected so that the light pattern aligns with the proximity indicator(s) when the vehicle is a desired distance from the object and/or within the parking position.

For example, one embodiment provides a vehicle comprising an end facing an external object, at least one vehicle light positioned adjacent to the end and projecting a light pattern onto the object, a window adjacent to the end, and at least one proximity indicator coupled to the window at a predetermined position corresponding to an expected location of the light pattern on the object when the end is located a predetermined distance from the object.

Another example embodiment provides a vehicle comprising a rear end, a rear window, at least one rear light configured to project a light pattern onto an object behind the rear end, and at least one proximity indicator coupled to the rear window at a predetermined position corresponding to an expected location of the light pattern on the object when the rear end is located a predetermined distance from the object.

Yet another example embodiment provides a vehicle comprising a front end, a front window, at least one front light configured to project a light pattern onto an object in front of the front end, and at least one proximity indicator coupled to the front window at a predetermined position corresponding to an expected location of the light pattern on the object when the front end is located a predetermined distance from the object.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
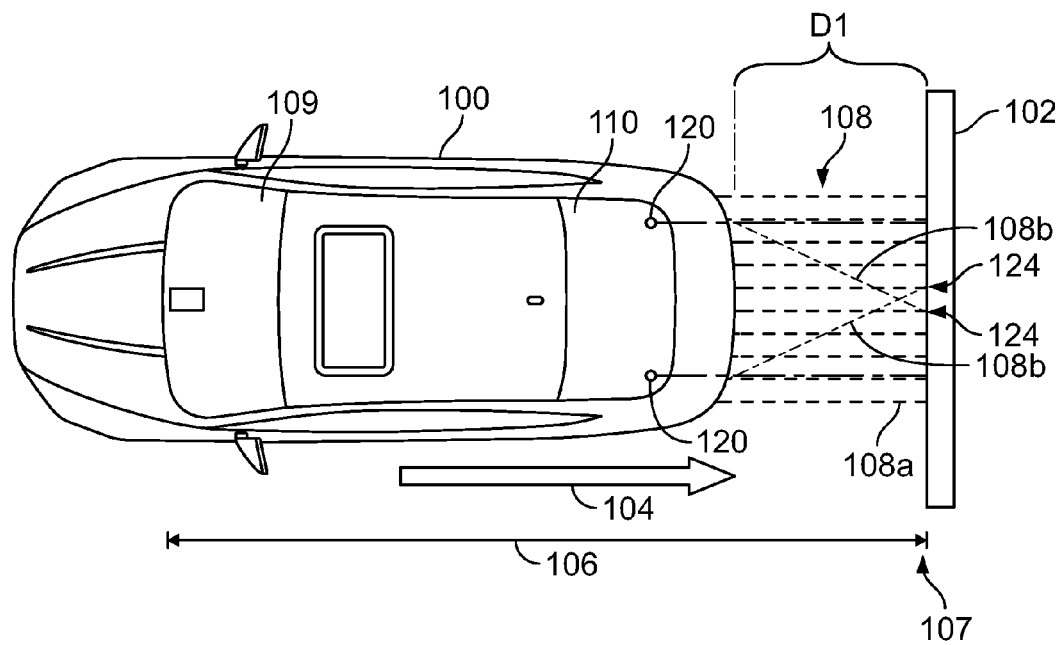
FIG. 1A is a top view of an exemplary vehicle positioned at a first distance from an object and projecting an exemplary horizontal light pattern onto the object, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1B:
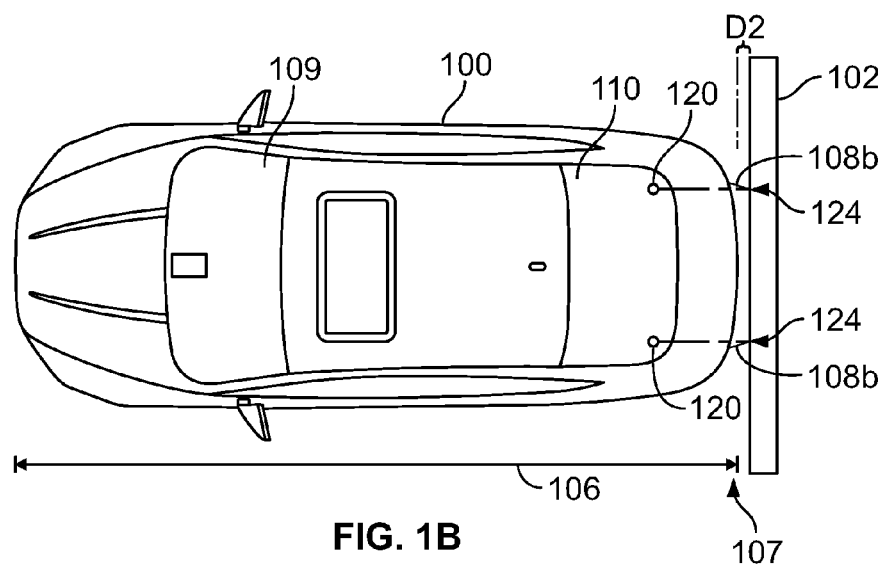
FIG. 1B is a top view of the vehicle in FIG. 1A positioned at a second distance from the wall, in accordance with certain embodiments.

FIGS. 1A and 1B illustrate an exemplary vehicle 100 and an object 102 positioned within a traveling path 104 of the vehicle 100. In embodiments, the vehicle 100 travels towards the object 102, along the traveling path 104, as the driver maneuvers the vehicle 100 into a parking position 106. As shown in FIG. 1A, the vehicle 100 may be initially positioned at least partially outside of the parking position 106 at a first horizontal distance D1 from the object 102. The distance between the vehicle 100 and the object 102 may gradually decrease as the vehicle 100 moves further into the parking position 106, until the vehicle 100 is fully positioned within the parking position 106 at a predetermined horizontal distance D2 from the object 102, as shown in FIG. 1B.

While the vehicle 100 is shown as a sedan in FIGS. 1A and 1B, it will be appreciated that the vehicle 100 may be any type of motor vehicle, including, but not limited to, a sports utility vehicle (SUV), minivan, van, truck, station wagon, etc. Also, in the illustrated embodiments, the vehicle 100 is shown as moving in reverse, or in a rearward direction, towards the object 102 and so, the horizontal distances D1 and D2 are measured from a rear end of the vehicle 100 to the object 102. In other embodiments, the vehicle 100 may be moving in a forward direction towards the object 102, such that the horizontal distances D1 and D2 are measured from a front end of the vehicle 100 to the object 102.

In some cases, the predetermined distance D2 may be selected according to a standardized measurement, such as, for example, a fixed number of inches from the object 102 (e.g., two inches, three inches, etc.). In other cases, the predetermined distance D2 is selected based on a preference of the driver, for example, based on how close to the object 102 the driver would like to park the vehicle 100. For example, some drivers may want to reserve walking space between the vehicle 100 and the object 102 and/or enough space to access a trunk or hood of the vehicle 100 while in the parking position 106. Other drivers may want to position the vehicle 100 close as possible to the object 102. Still other drivers may want to position the vehicle 100 as far as possible from the object 102 but still within the parking position 106.

The object 102 can be any surface or structure that delineates a far end 107 of the parking position 106. In some cases, the object 102 is a full wall, a half wall, a partial wall, a column, a fence, or any other barrier positioned adjacent to the far end 107 of the parking position 106. For example, the object 102 may be a wall within a parking structure or garage. In other cases, the object 102 is another vehicle positioned adjacent to the far end 107 of the parking position 106, for example, in a parking lot. In still other cases, the object 102 includes a series of objects, such as, for example, a row of pillars, two or more columns, or other set of structures positioned adjacent to the far end 107 of the parking position 106.

In embodiments, the vehicle 100 includes a plurality of external vehicle lights (not shown) that are configured to project a light pattern 108 onto the object 102. A reflection of the light pattern 108 on the object 102 can be viewed by the driver through a vehicle window facing the object 102. For example, as shown in FIGS. 1A and 1B, the vehicle 100 includes at least two vehicle windows: a rear window or windshield 109 at the rear of the vehicle 100 and a front window or windshield 110 at the front of the vehicle 100. If the vehicle 100 is moving rearward, as shown in FIG. 1A, a reflection of the light pattern 108 may be visible through the rear window 110, and if the vehicle 100 is moving forward, a reflection of the light pattern 108 may be visible through the front window 109. When the vehicle 100 is moving rearward towards the object 102, the light pattern 108 may be generated by a combination of one or more rear vehicle lights 112, such as, for example, tail lights 113, backup or reversing lights 114, brake lights 115 (also referred to as "stop lights"), a third brake light 116 (also referred to as "center high mount stop lamp (CHMSL)"), turn signal lights 117, and rear side markers 118, as shown by the exemplary vehicle depicted in FIG. 2. When the vehicle 100 is moving forward towards the object 102, the light pattern 108 may be generated by a combination of one or more front vehicle lights (not shown), such as, for example, headlights, fog lights, daytime running lights, parking lights, turn signal lights, front side markers, and/or side view mirror lights.

In the illustrated embodiment, the light pattern 108 is projected in a substantially horizontal direction relative to the ground and includes a number of light streaks 108a that are directed towards the object 102 in a substantially perpendicular direction, and at least two light beams 108b that are projected towards each other at a predetermined angle of convergence, such that the light beams 108b intersect between the vehicle 100 and the object 102, as shown in FIG. 1A. To generate the light pattern 108, at least one pair of the rear vehicle lights 112 may be configured to project defined light beams 108b at the predetermined angle of convergence, for example, by adjusting the optics of the lights. In one example embodiment, the tail lights 108 are specifically configured to project the defined light beams 108b as shown in FIG. 1A. In other cases, a pair of the front vehicle lights, such as, e.g., the headlights of the vehicle 100, may be specifically configured to project directed light beams towards the object 102 as the vehicle 100 drives forward into the parking position 106. While the light streaks 108a are not shown in FIG. 1B for the sake of clarity, it will be understood that the light streaks 108a may also be visible behind the vehicle 100 when at the distance D2.

The exact light pattern 108 reflected on the object 102 may vary depending on a number of factors, including the type and/or color of the vehicle lights illuminating the object 102 (e.g., front lights versus rear lights, red lights versus white lights, etc.), the model, type and/or size of the vehicle 100 (e.g., sedan versus van), and the location of the vehicle lights on the vehicle 100 (e.g., aligned with roof versus on top of hood). In some cases, the external vehicle lights can be specifically configured to project a predefined light pattern (e.g., a series of vertical light streaks or other image) onto the object 102, for example, by adjusting the optics of the lights through the use of diffraction, grating, filters, and/or other similar techniques for controlling the light projected from the vehicle lights.

In embodiments, the light pattern 108 reflected on the object 102 and visible through the vehicle windows 109, 110 can change as the distance between the vehicle 100 and the object 102 decreases due to the projection of shorter and/or more intense light streaks 108a and light beams 108b onto the object 102. For example, as shown in FIG. 1B, when the vehicle 100 is positioned at the distance D2, a shorter portion of the light beams 108b is projected onto the object 102, as compared to when the vehicle 100 is positioned at the distance D1 in FIG. 1A. In embodiments, this inverse relationship between the light pattern 108 and the distances D1 and D2 can be utilized to provide the driver with an indication of the proximity between the vehicle 100 and the object 102. In particular, certain markers within the light pattern 108, as reflected onto the object 102 and visible through the vehicle window 109, 110, can signify when the vehicle has reached the distance D2. Accordingly, placing one or more proximity indicators 120 on the vehicle window 109, 110 at the expected or approximated locations of these markers provides the driver with a visual tool, or reference point, for determining when the vehicle 100 has reached the desired distance D2 from the object 102.

Figure 3A:
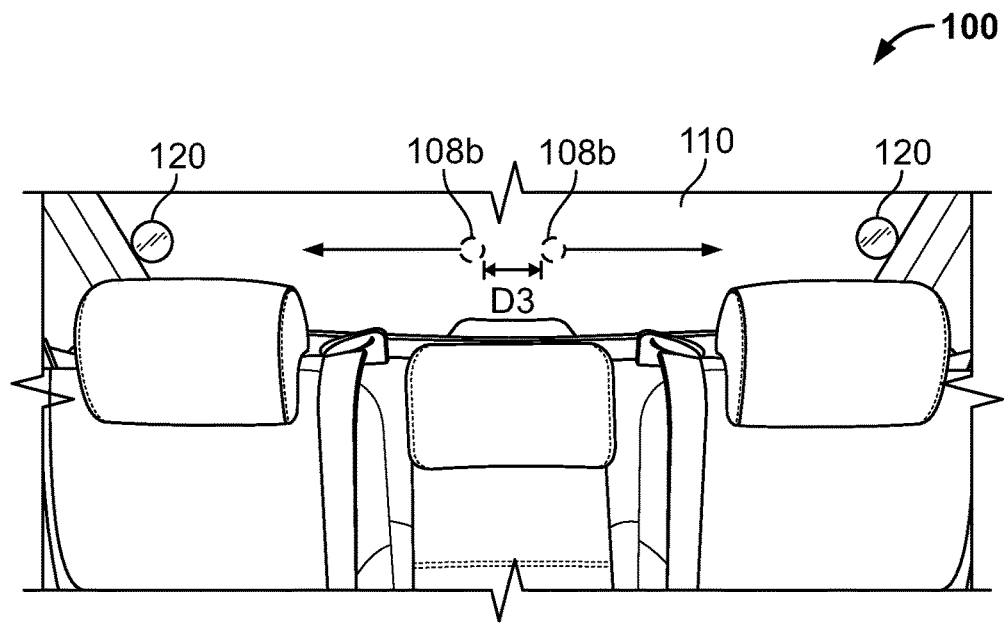
FIG. 3A is a front view of the rear window of the vehicle in FIG. 1A and the light pattern visible therethrough, in accordance with certain embodiments.
Figure 3B:
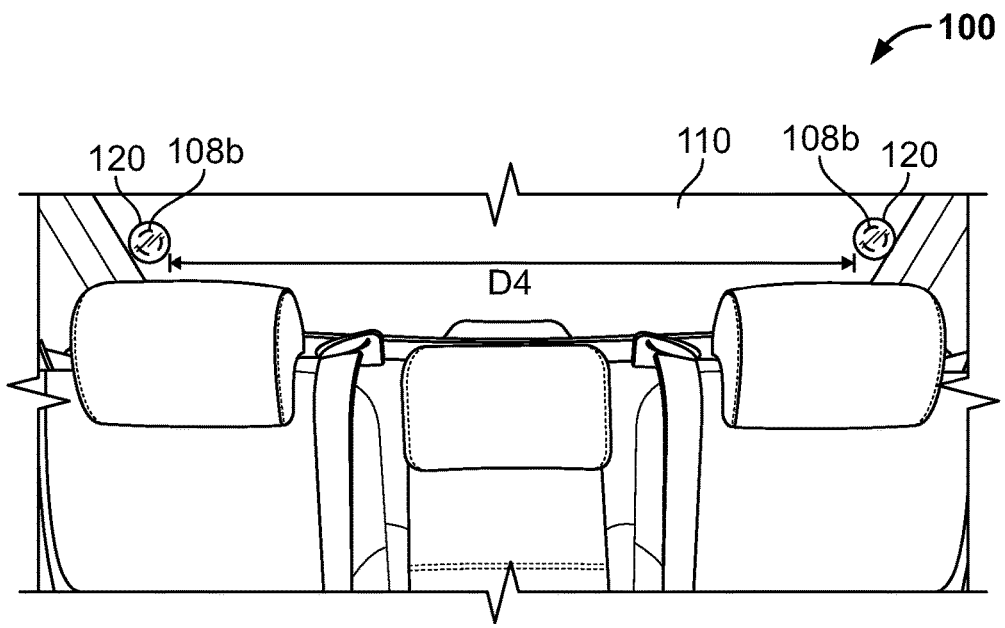
FIG. 3B is a front view of the rear window of the vehicle in FIG. 1B and the light pattern visible therethrough, in accordance with certain embodiments.

For example, FIGS. 3A and 3B depict one configuration for placement of the proximity indicators 120 on the rear window 110 based on a horizontal change in the light beams 108b as the vehicle 100 travels towards the object 102, in accordance with embodiments. FIG. 3A corresponds to FIG. 1A, depicting the light beams 108b reflected on the object 102 as viewed through the rear window 110 when the vehicle 100 is positioned at the distance D1 from the object 102. Likewise, FIG. 3B corresponds to FIG. 1B, depicting the light beams 108b reflected on the object 102 as viewed through the rear window 110 when the vehicle 100 is positioned at the distance D2 from the object 102. The light streaks 108a are not shown in FIGS. 3A and 3B for the sake of clarity.

As shown, as the vehicle 100 moves closer to the object 102, the light beams 108b reflected on the object 102 appear to move horizontally and apart, across the rear window 110, mirroring a change in the locations 124 at which the light beams 108b intersect the object 102. More specifically, when the vehicle 100 is positioned at the distance D1, the light beams 108b appear to be separated by a small horizontal distance D3, and when the vehicle 100 is positioned at the distance D2, the light beams 108b appear to be separated by a larger horizontal distance D4. Thus, there is an inverse relationship between the distances D1, D2 and the distances D3, D4. The proximity indicators 120 are coupled, or affixed, to the rear window 110 at predetermined locations that correspond to the expected positions of the light beams 108b when the vehicle 100 is positioned at the distance D2 from the object 102. For example, the predetermined locations may be spaced apart by the distance D4, as shown. As illustrated in FIG. 1B, the predetermined locations of the proximity indicators 120 may also correspond to the locations 124 at which the light beams 108b intersect the object 102.

Using the proximity indicators 120, the driver of the vehicle 100 can determine whether the vehicle 100 is positioned the distance D2 from the object 102 and therefore, within the parking position 106. For example, when the light beams 108b visible through the rear window 110 are positioned towards the center and away from the proximity indicators 120, for example, as shown in FIG. 3A, this indicates to the driver that the vehicle 100 is still a fair distance (e.g., the distance D1) from the object 102. As the vehicle 100 continues to approach the object 102, each of the light beams 108b visible through the rear window 110 may move closer to a respective one of the proximity indicators 120. When the light beams 108b visible through the rear window 110 are substantially aligned with the proximity indicators 120, as shown in FIG. 3B, this informs the driver that the vehicle 100 has reached the distance D2 from the object 102 and therefore, the driver should stop moving the vehicle 100. While the illustrated embodiments and related discussions feature proximity indicators 120 affixed to the rear window 110, it will be appreciated that the same techniques may be applied to place proximity indicators 120 on the front windshield 109 of the vehicle 100 to guide the driver while driving the vehicle 100 forward towards the object 102.

According to embodiments, the proximity indicators 120 can be any form of sticker, decal, label, tag, or other sign that can be selectively applied to the vehicle window 109, 110 at the predetermined locations. The proximity indicators 120 can be adhered to the vehicle window 109, 110 using any suitable technique, including, for example, adhesive, removable tape, and static-cling. Further, the proximity indictors 120 can be made of any suitable material, including, for example, vinyl, plastic, etc. As shown in FIGS. 3A and 3B, the proximity indicators 120 can be substantially transparent or at least translucent, so that the light beams 108b are still visible through the proximity indicators 120 when overlapped by the proximity indicators 120. In a preferred embodiment, the proximity indicators 120 are removable vehicle stickers that can be re-positioned by the vehicle owner, as needed, for example, to accommodate a change in parking position when the vehicle owner moves to a new building or workplace.

Figure 2:
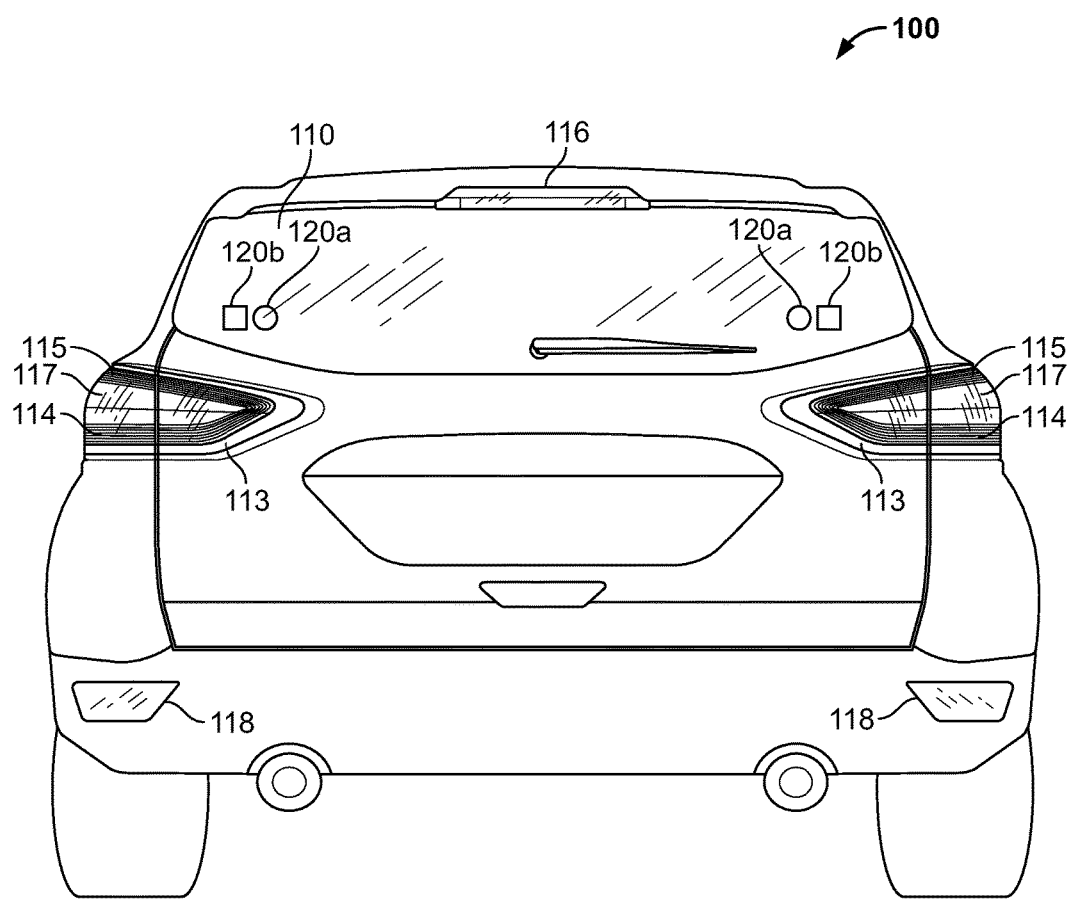
FIG. 2 is a rear view of an exemplary vehicle having a plurality of rear lights, in accordance with certain embodiments.
Figure 6A:
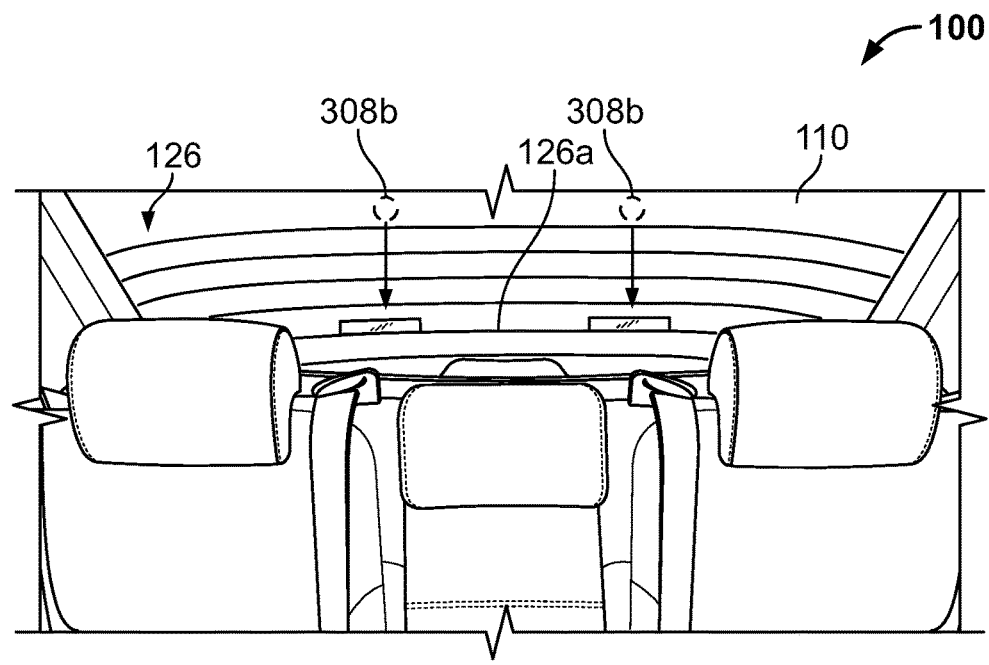
FIG. 6A is a front view of the rear window of the vehicle in FIG. 5 and the light pattern visible therethrough, in accordance with certain embodiments.
Figure 6B:
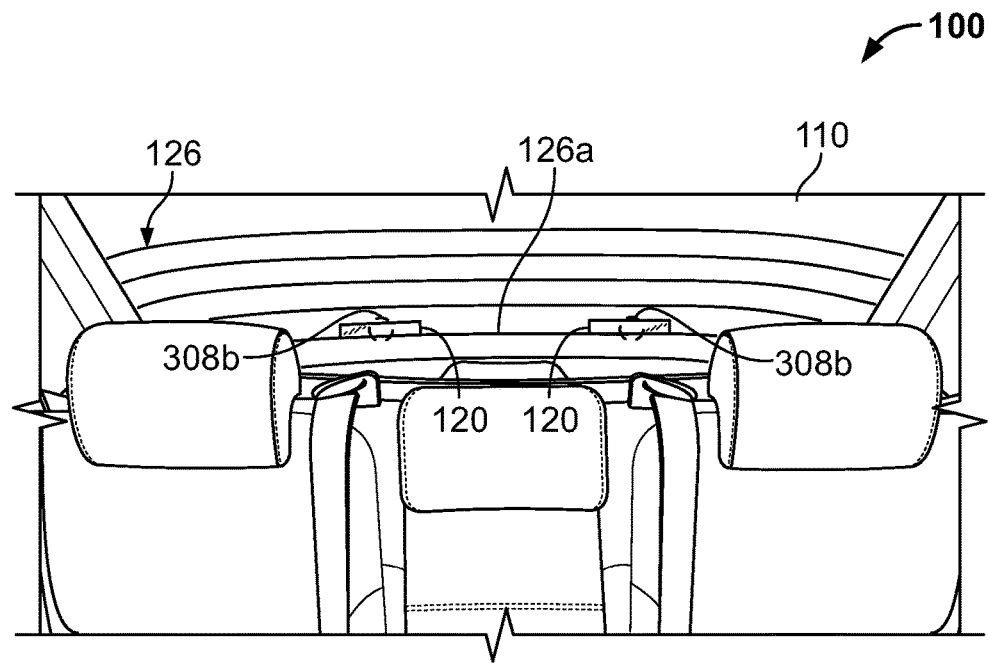
FIG. 6B is a front view of the rear window of the vehicle in FIG. 5B and the light pattern visible therethrough, in accordance with certain embodiments.

Alternatively, the proximity indicators 120 can be printed, etched, painted, or otherwise integrated into the vehicle window 109, 110. Also, in some cases, only one proximity indicator 120 may be sufficient to determine alignment with the light beams 108b. Further, while the proximity indicators 120 are shown as having a substantially circular shape, in other embodiments, the proximity indicators 120 can have any other shape and/or size, for example, a square shape as shown in FIG. 2 or a rectangular shape as shown in FIGS. 6A and 6B. In some cases, the proximity indicators 120 can be in the shape of one or more lines that are vertically or horizontally positioned on the vehicle window 109, 110, depending on the characteristics of the light pattern 108.

In some embodiments, the proximity indicators 120 are pre-applied to the vehicle 100, for example, during the manufacturing or post-production stages. In such cases, the predetermined locations of the proximity indicators 120, and the corresponding distance D4 therebetween, can be selected based on a preset distance D2. For example, based on the specific light pattern 108 generated by the vehicle 100, the manufacturer may determine that when the vehicle 100 is a distance D2 of 2 inches from the object 102, the proximity indicators 120 need to be positioned apart by a distance D4 of 20 centimeters. In other embodiments, the proximity indicators 120 may be provided as an optional after-market product that the vehicle owner installs, by herself, after determining a desired distance D2 between the vehicle 100 and the object 102 and measuring the corresponding distance D4 between the light beams 108b in the vehicle window 109, 110. In either case, the proximity indicators 120 are preferably placed on the vehicle window 109, 110 at a height that is visible to the driver but not disruptive to the driver's field of view, and centered about the third brake light 116 or other central point.

In some cases, the vehicle owner may wish to install more than one set of proximity indicators 120 to help guide the driver into different parking positions. For example, a parking position at work may require a different distance D2 than a parking position at home. For such cases, the proximity indicators 120 may be made in various different colors or shapes, so the vehicle owner can differentiate between multiple sets of proximity indicators 120 on the same vehicle window 109, 110. For example, FIG. 2 shows a first set of proximity indicators 120a with a circular shape at first predetermined locations configured for a first parking position and a second set of proximity indicators 120b with a square shape at second predetermined locations configured for a second parking position. As shown, the second proximity indicators 120b are positioned further apart than the first proximity indicators 120a because, for example, the second parking position may require a longer D4 distance, or a shorter D2 distance, than the first parking position.

Figure 4A:
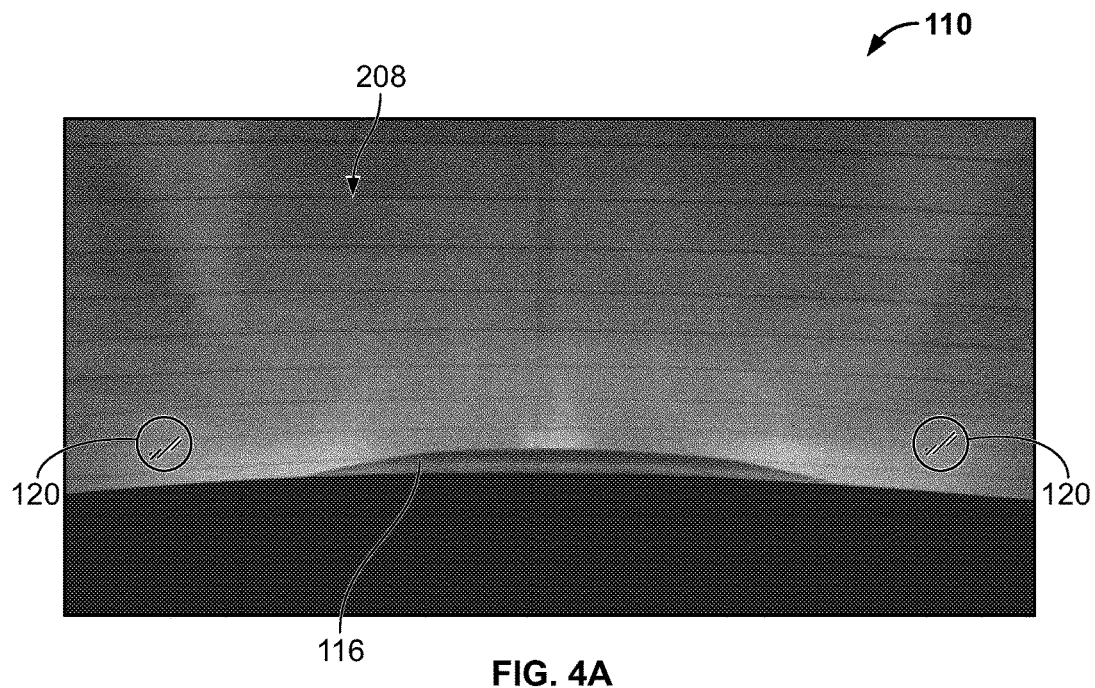
FIG. 4A is a bitmap image of another exemplary light pattern visible through the rear window of the vehicle in FIG. 1A, in accordance with certain embodiments.
Figure 4B:
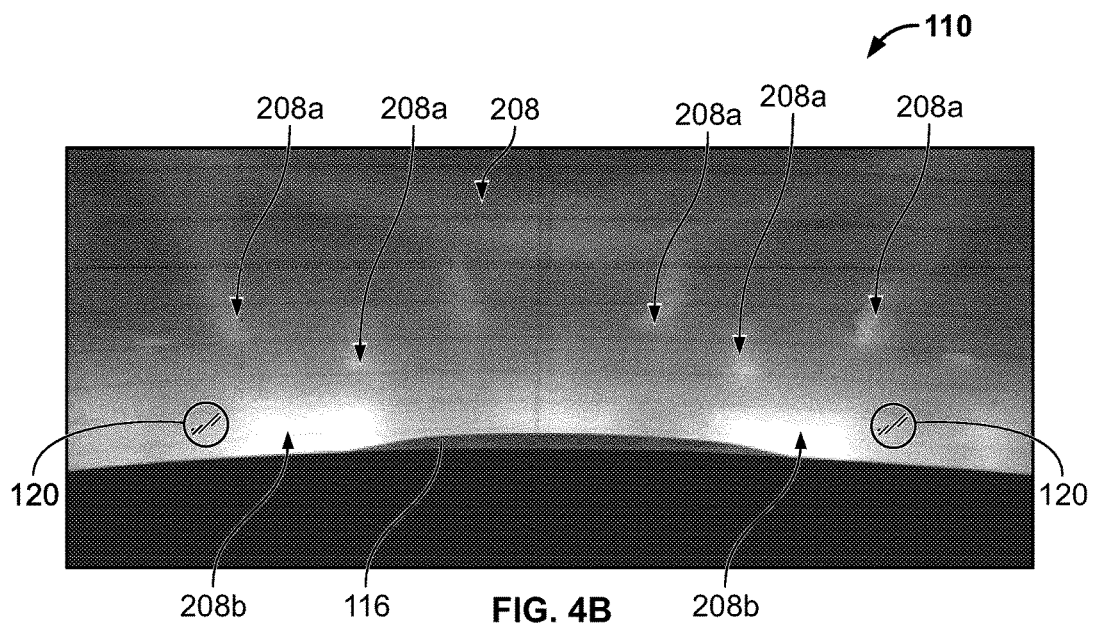
FIG. 4B is a bitmap image of another exemplary light pattern visible through the rear window of the vehicle in FIG. 1B, in accordance with certain embodiments.

FIGS. 4A and 4B depict another exemplary configuration for placement of the proximity indicators 120 on the rear window 110 based on changes in a light pattern 208 reflected on the object 102 and visible through the rear window 110, in accordance with embodiments. As shown by the exemplary bitmap images in FIGS. 4A and 4B, the light pattern 208 reflected on the object 102 includes a combination of shadows and light streaks that evolves or changes (e.g., sharpens) as the distance between the vehicle 100 and the object 102 changes (e.g., decreases). More specifically, FIG. 4A shows the light pattern 208 that is visible through the rear window 110 when the vehicle 100 is positioned at the distance D1 from the object 102, and FIG. 4B shows the light pattern 208 that is visible through the rear window 110 when the vehicle 100 is positioned at the distance D2 from the object 102. The light pattern 208 may consist of indiscernible light streaks when the vehicle 100 is at the distance D1, as shown in FIG. 4A. As the vehicle 100 moves closer to the object 102, the light pattern 208 evolves so that these light streaks become sharper or more defined. By the time the vehicle 100 reaches the distance D2 from the object 102, the light pattern 208 consists of a plurality of more discernible light streaks 208a and at least two substantially defined light beams 208b that are visible through rear window 110 at two locations aligned to the width of the third brake light 116, as shown in FIG. 4B.

The defined light beams 208b, as viewed through the rear window 110, can help guide placement of the proximity indicators 120 on the rear window 110. For example, as shown in FIG. 4B, the proximity indicators 120 can be placed adjacent to the outer edges of the light beams 208b, and/or at predetermined distances from either side of the third brake light 116. When the outer edges of the light beams 108b reach the proximity indicators 120, as shown in FIG. 4B, this indicates to the driver that the vehicle 100 is positioned at the distance D2 from the object 102. In some cases, the proximity indicators 120 may be vertical lines, instead of circles, to more clearly indicate when the outer edges of the light beams 208b are aligned with the proximity indicators 120.

According to embodiments, the defined light beams 208b are produced by a specified pair of rear lights 112, while the light streaks 108a and the remaining lights in the light pattern 108 are produced by the remaining rear lights 112. For example, in the illustrated embodiment, the light beams 208b are emitted by the reversing lights 114, which produce a white-colored light that may be easier to discern from the other lights in the light pattern 208. In other cases, the specified pair of rear lights 112 is configured to emit a sharper or more defined light beam, for example, as shown by the light beams 108b in FIGS. 3A and 3B, or otherwise more clearly distinguish the light beams 208b over the other lights in the light pattern 208, for example, by adjusting the optics of the lights.

In the preceding examples, a horizontal reading technique is used to determine the vehicle-to-object proximity by looking at a horizontal change in the light pattern 108 projected onto the object 102 and visible through the vehicle window 109, 110. In such embodiments, the vehicle lights are configured to project at least a portion of the light pattern 108 in a substantially horizontal direction (e.g., parallel to the ground), thus enabling the horizontal reading technique. In other embodiments, the vehicle lights may be configured to project at least a portion of the light pattern at a predefined angle, or in a partially vertical direction, relative to the ground. In such cases, a vertical reading technique can be utilized to ascertain the vehicle-to-object proximity and provide an indication of said proximity to the driver.

Figure 5A:
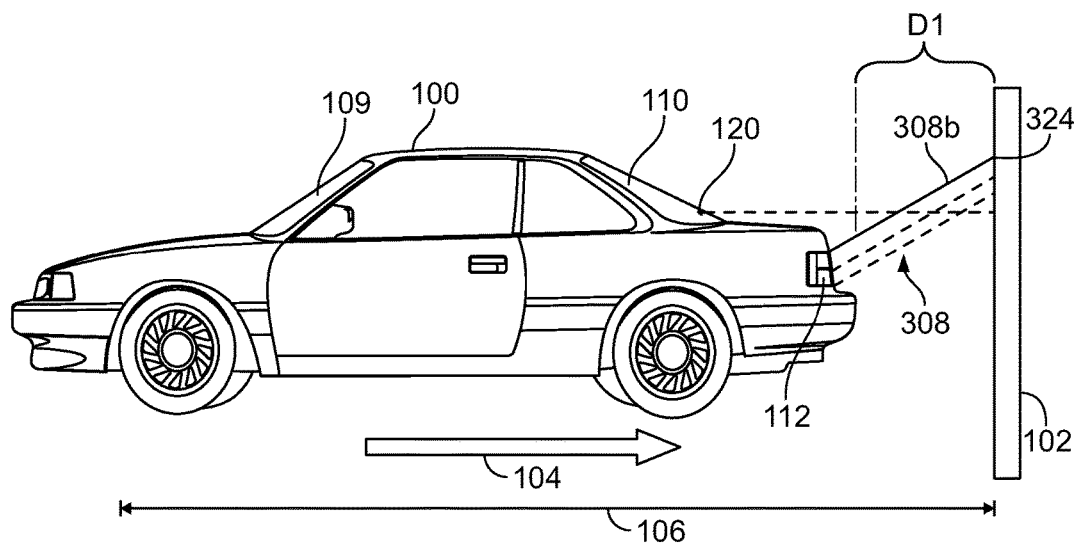
FIG. 5A is a side view of an exemplary vehicle positioned a first distance from an object and projecting an exemplary vertical light pattern onto the object, in accordance with certain embodiments.
Figure 5B:
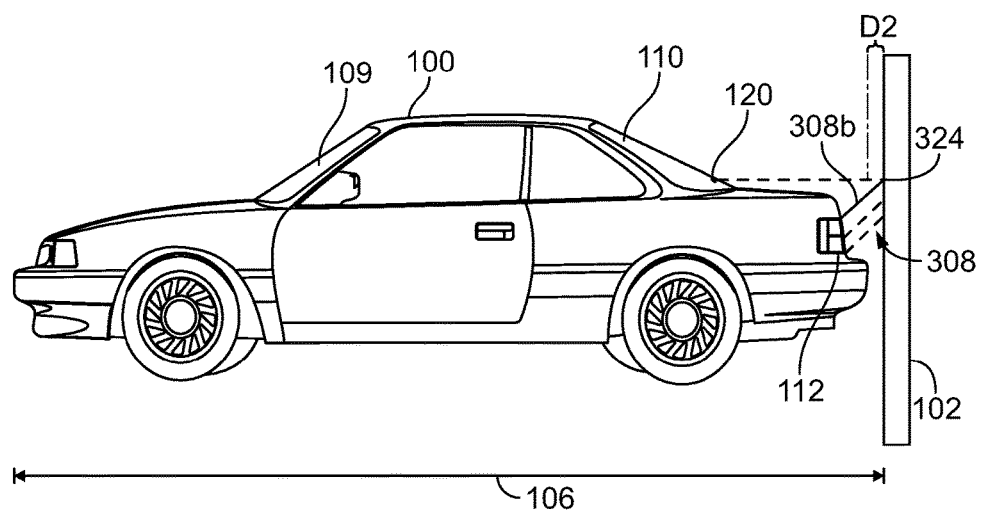
FIG. 5B is a side view of the vehicle in FIG. 5A at a second distance from the object, in accordance with certain embodiments.

For example, FIGS. 5A and 5B illustrate a side view of the vehicle 100 with rear vehicle lights 112 configured to project an angled light pattern 308 onto the object 102 behind the vehicle 100, in accordance with embodiments. As show, the light pattern 308 projects upwards above or past a trunk height of the vehicle 100 and into a line of sight captured by the rear window 110. The light pattern 308 includes at least one pair of defined light beams 308b that may be projected from a specified pair of the rear vehicle lights 112, such as, for example, the tail lights 113. In some cases, the specified pair of rear vehicle lights 112 can be configured to project the light pattern 308 at a pre-specified angle that is sufficient to enable a reflection of the light beams 308b on the object 102 to be viewed through the rear window 110 (or front window 109 if the vehicle 100 is moving forward towards the object 102). As shown, the light beams 308b intersect the object 102 at location 324. As the vehicle 100 moves closer to the object 102 (e.g., from the distance D1 shown in FIG.

5A to the distance D2 shown in FIG. 5B), the location 324 moves vertically down the object 102. In embodiments, one or more proximity indicators 120 may be placed on the rear window 110 at predetermined location(s) that correspond to the location 324 of the light beams 308b when the vehicle 100 is at the distance D2, as shown in FIG. 5B.

FIGS. 6A and 6B depict one exemplary configuration for placement of the proximity indicators 120 on the rear window 110 based on a vertical change in the light beams 308b as the vehicle 100 travels towards the object 102, in accordance with embodiments. FIG. 6A corresponds to FIG. 5A, depicting the light beams 308b reflected on the object 102 as viewed through the rear window 110 when the vehicle 100 is positioned at the distance D1 from the object 102. Likewise, FIG. 6B corresponds to FIG. 5B, depicting the light beams 308b reflected on the object 102 as viewed through the rear window 110 when the vehicle 100 is positioned at the distance D2 from the object 102.

As shown, as the vehicle 100 moves closer to the object 102, the light beams 308b reflected on the object 102 appear to move down vertically, from a top of the rear window 110 towards a bottom thereof, mirroring a change in the location 324 at which the light beams 308b intersect the object 102. Accordingly, the proximity indicators 120 are affixed to the rear window 110 at predetermined locations near the bottom of the rear window 110 that correspond to the expected height or position of the light beams 308b once the vehicle 100 reaches the distance D2, as shown in FIG. 6B. In use, when the light beams 308b are positioned towards the top of the rear window 110, as shown in FIG. 6A, this indicates to the driver of the vehicle 100 that the distance between the vehicle 100 and the object 102 is still fairly large (e.g., the distance D1). Once the height of the light beams 308b are aligned with the proximity indicators 120, this signals the driver to stop moving the vehicle 100, as the desired distance D2 has been reached.

In some cases, the rear window 120 includes a plurality of defroster lines 126 which can be used as guides for placement of the proximity indicators 120. For example, as shown in FIG. 6B, when the vehicle 100 is positioned at the distance D2 from the object 102, the light beams 308b may align with a defroster line 126a that is second from the bottom of the rear window 120. Accordingly, the proximity indicators 120 may be positioned adjacent to the defroster line 126a. In some cases, the rear window 110 may include only a single proximity indicator 120 that is shaped as a line and positioned parallel and/or adjacent to the second defroster line 126a, or at another height corresponding to the expected vertical position of the light beams 308b when the vehicle 100 is at the distance D2 from the object 102.

Figure 7A:
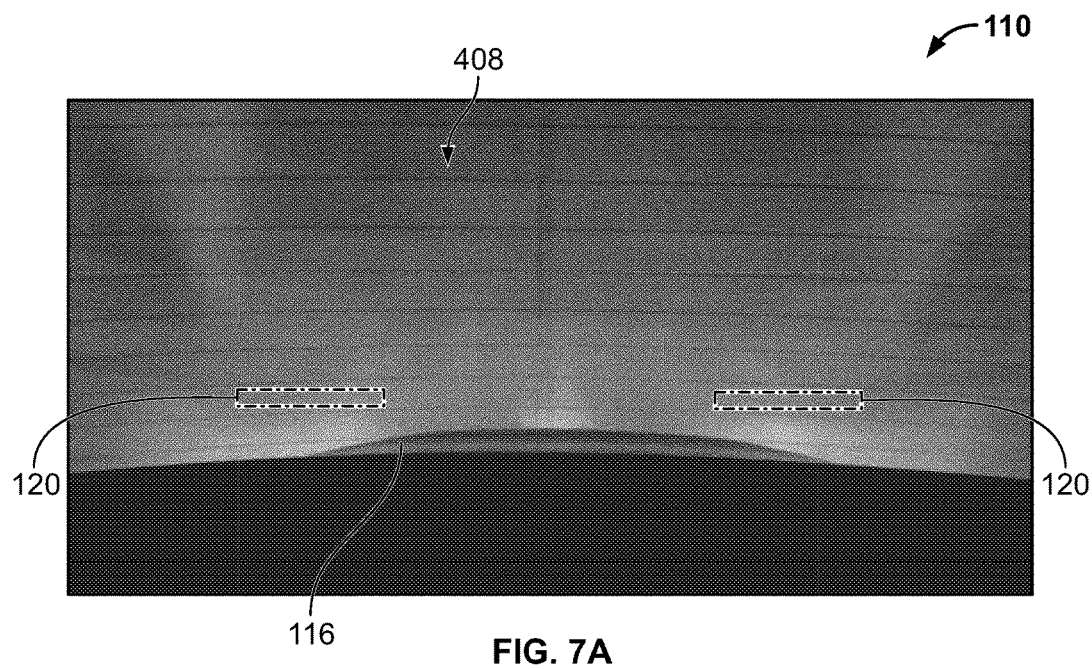
FIG. 7A is a bitmap image of another exemplary light pattern visible through the rear window of the vehicle in FIG. 5A, in accordance with certain embodiments.
Figure 7B:
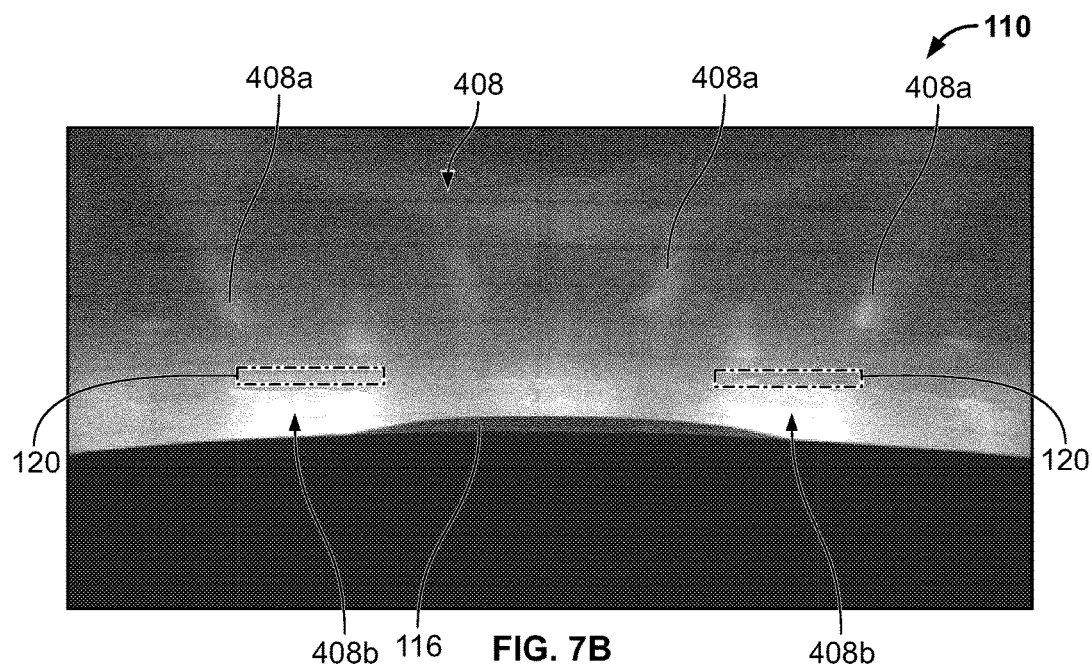
FIG. 7B is a bitmap image of another exemplary light pattern visible through the rear window of the vehicle in FIG. 5B, in accordance with certain embodiments.

FIGS. 7A and 7B depict another exemplary configuration for placement of the proximity indicators 120 on the rear window 110 based on changes in a light pattern 408 reflected on the object 102 and visible through the rear window 110, in accordance with embodiments. As shown by the exemplary bitmap images in FIGS. 7A and 7B, the light pattern 408 reflected on the object 102 includes a combination of shadows and light streaks that evolves or changes (e.g., sharpens) as the distance between the vehicle 100 and the object 102 changes (e.g., decreases). More specifically, FIG. 7A shows the light pattern 408 that is visible through the rear window 110 when the vehicle 100 is positioned at the distance D1 from the object 102, and FIG. 4B shows the light pattern 408 that is visible through the rear window 110 when the vehicle 100 is positioned at the distance D2 from the object 102. The light pattern 408 may consist of indiscernible light streaks when the vehicle 100 is at the distance D1, as shown in FIG. 7A. As the vehicle 100 moves closer to the object 102, the light pattern 408 evolves so that these light streaks become sharper or more defined. By the time the vehicle 100 reaches the distance D2 from the object 102, the light pattern 408 consists of a plurality of discernible light streaks 408a and at least two substantially defined light beams 408b that are visible through rear window 110 at two locations aligned to the width of the third brake light 116, as shown in FIG. 7B.

The defined light beams 408b, as viewed through the rear window 110, can help guide placement of the proximity indicators 120 on the rear window 110. For example, as shown in FIG. 7B, the proximity indicators 120 can be placed adjacent to the expected height of the top edges of the light beams 408b and/or adjacent to one of the defroster lines 126 that are expected to align with the top edges of the light beams 408b. When the top edges of the light beams 408b reach the proximity indicators 120, as shown in FIG. 7B, this indicates to the driver that the vehicle 100 is positioned at the distance D2 from the object 102. In some cases, the proximity indicators 120 may be vertical lines, instead of rectangles, to more clearly indicate when the top edges of the light beams 408b are aligned with the proximity indicators 120.

According to embodiments, the defined light beams 408b are produced by a specified pair of rear lights 112, while the light streaks 408a and the remaining lights in the light pattern 408 are produced by the remaining rear lights 112. For example, in the illustrated embodiment, the light beams 408b are emitted by the reversing lights 114, which produce a white-colored light that may be easier to discern from the other lights in the light pattern 408. In other cases, the specified pair of rear lights 112 is configured to emit a sharper or more defined light beam, for example, as shown by the light beams 308b in FIGS. 6A and 6B, or otherwise more clearly distinguish the light beams 408b over the other lights in the light pattern 408, for example, by adjusting the optics of the lights.

Figure 8A:
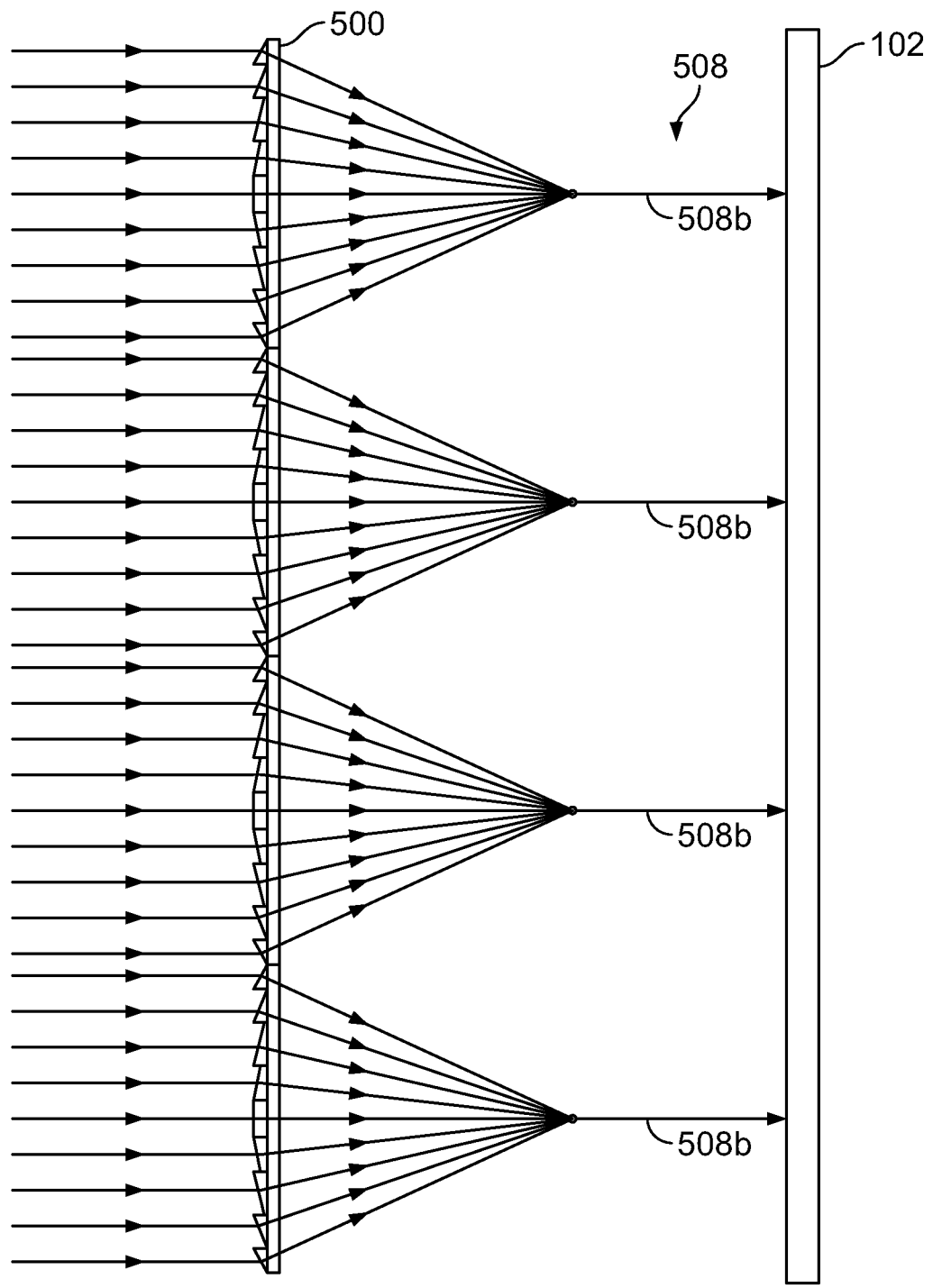
FIG. 8A is a graphical depiction of light passing through an exemplary lens in an exemplary vehicle light, in accordance with certain embodiments.
Figure 8B:
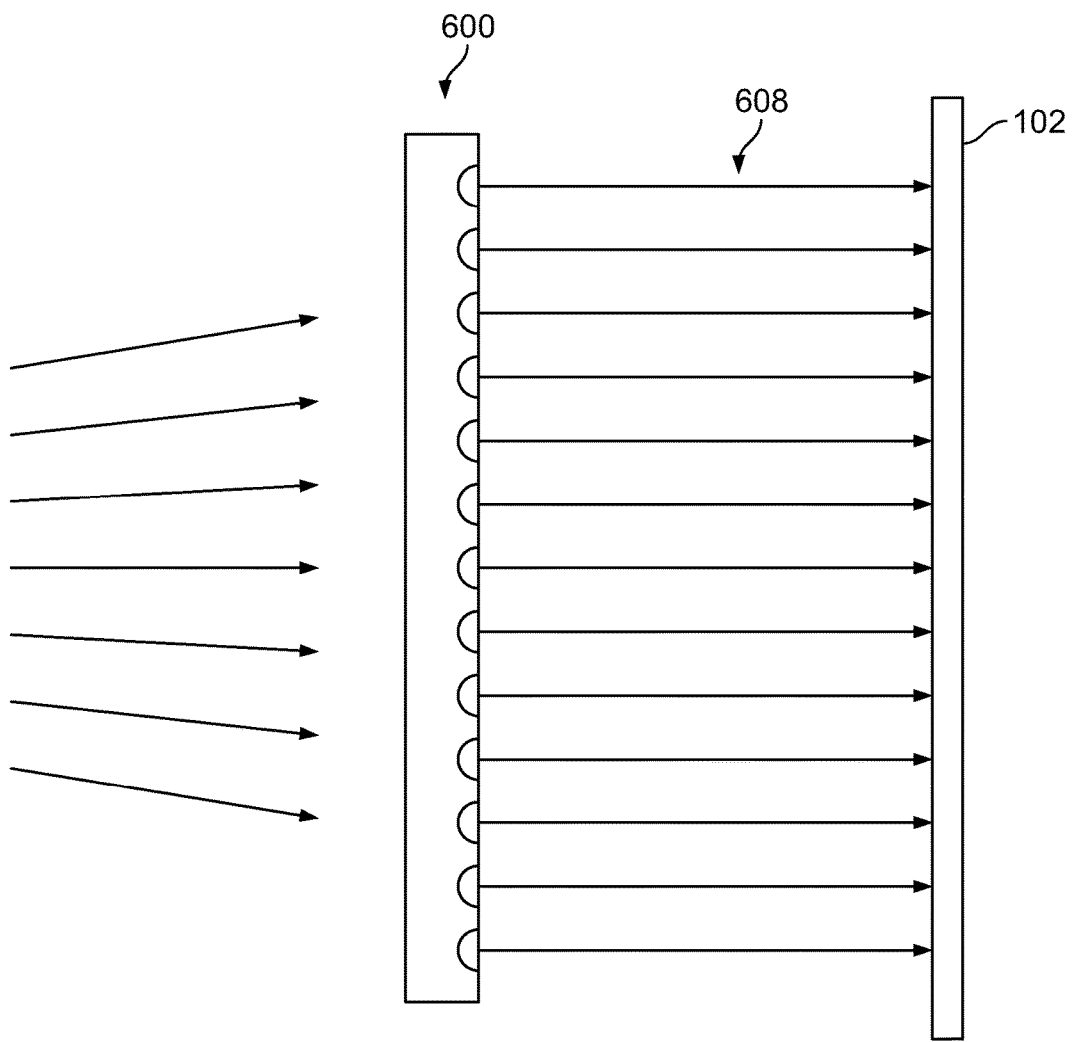
FIG. 8B is a graphical depiction of light passing through another exemplary lens in an exemplary vehicle light, in accordance with certain embodiments.

FIGS. 8A and 8B depict exemplary lens optics that may be utilized to control light spread in the vehicle lights described herein and thereby, focus the light streaks projected on the object 102. In some embodiments, the light optics can be adjusted to create a more conspicuous light pattern, or a defined "proximity light spot," that can be easily aligned with the proximity indicators 120 affixed to the rear window 120, for example, as shown by the light beams 108b in FIGS. 3A and 3B and the light beams 308b in FIGS. 6A and 6B. FIG. 8A depicts a plan view of an exemplary array of Fresnel lenses 500 that may be included in the third brake light 116 and configured to project a defined horizontal light pattern 508 on the object 102 by focusing the light streaks into a row of four defined light beams 508b. FIG. 8B depicts a plan view of an exemplary fluted lens 600 that may be included in the backup lights 114 and/or the brake lights 115 and configured to focus the light streaks into a horizontal light pattern 608 comprising a plurality of directed light beams. It will be appreciated that other optics technology may be utilized to create a desired light pattern for any of the vehicle lights. For example, instead of the horizontal light patterns 508, 608 shown in FIGS. 8A and 8B, the vehicle lights may include vertically-oriented diffraction grating for projecting a vertical light pattern comprising a plurality of vertical light beams (e.g., rotated 90 degrees from the light patterns 508, 608).

Thus, this disclosure provides techniques for indicating, on a vehicle window, a distance between the vehicle and an object within a path of the vehicle as a driver guides the vehicle into a parking position, such as, for example, against a wall or within a parking structure. A light pattern projected onto the object by one or more vehicle lights is visible through the vehicle window facing the object and provides certain markers that change as the distance between the vehicle and the object changes. One or more vehicle proximity indicators are placed on the vehicle window (e.g., front or rear windshield) at predetermined locations that correspond to the locations of these markers in the light pattern when the vehicle is a desired distance between from the object, or within the parking position. Accordingly, a distance between the markers, or defined aspects, of the light pattern and the one or more proximity indicators provides an indication of the distance between the vehicle and the object, and an alignment of the defined aspects of the light pattern with the proximity indicator(s) signals to the driver that the vehicle is the desired distance from the object and therefore, within the parking position.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims. This includes any alternate implementations of the processes or methods shown in the figures, such as FIG. 7, in which functions may be executed out of order from that shown or discussed, including substantially concurrently or in reverse order, depending on the functionality involved, as would be understood by those having ordinary skill in the art.

The invention claimed is:

1. A vehicle comprising:
   an end to face an external object;
   at least one vehicle light positioned adjacent to the end for projecting a light pattern onto the object;
   a window adjacent to the end; and
   at least one proximity indicator coupled to the window at a predetermined position, the at least one proximity indicator is to align with the light pattern on the object when the end is located a predetermined distance from the object.

2. The vehicle of claim 1, wherein the light pattern moves along the object and relative to the at least one proximity indicator on the window as the end of the vehicle travels towards the object from a first distance to the predetermined distance.

3. The vehicle of claim 2, wherein the light pattern includes two light beams configured to move apart horizontally as the end of the vehicle travels towards the object from the first distance.

4. The vehicle of claim 3, wherein the two light beams are to be spaced apart by an expected horizontal distance when the end of the vehicle is located at the predetermined distance from the object, the at least one proximity indicator includes a first proximity indicator coupled to the window at a first position and a second proximity indicator coupled to the window.

5. The vehicle of claim 4, wherein the first proximity indicator aligns with a first of the two light beams and the second proximity indicator sensor aligns with a second of the two light beams when the end of the vehicle is located at the predetermined distance from the object.

6. The vehicle of claim 2, wherein the light pattern includes at least one light beam configured to move down vertically along the object as the end of the vehicle travels towards the object.

7. The vehicle of claim 6, wherein the at least one light beam is to be positioned on the object at an expected vertical height when the end of the vehicle is located at the predetermined distance from the object such that the at least one proximity indicator aligns with the at least one light beam when the at least one light beam is at the expected vertical height.

8. The vehicle of claim 1, wherein the end includes at least one of a front end of the vehicle and a rear end of the vehicle.

9. The vehicle of claim 1, wherein the at least one vehicle light is selected from at least one of front vehicle lights and rear vehicle lights included in the vehicle.

10. The vehicle of claim 1, wherein the at least one proximity indicator is aligned with at least one of a defroster line and located on the window and a third brake light.

11. The vehicle of claim 1, wherein the at least one proximity indicator is integrated into the window.

12. The vehicle of claim 1, wherein the light pattern is visible through the window from an interior of the vehicle.

13. The vehicle of claim 1, wherein the proximity indicator coupled to the window does not emit light.

14. The vehicle of claim 1, wherein, from a viewpoint of a driver, the light pattern is located within the proximity indicator when the end is located a predetermined distance from the object.

15. The vehicle of claim 1, wherein the at least one proximity indicator includes a first indicator that aligns with the light pattern on the object when the end is located at the predetermined distance from the object and a second indicator that aligns with the light pattern on the object when the end is located at a second predetermined distance from the object.

16. A vehicle comprising:
    a rear end;
    a rear window;
    a rear light configured to project a light pattern onto an object behind the rear end; and
    a proximity indicator coupled to the rear window at a predetermined position the proximity indicator is to align with the light pattern projected on the object when the rear end is located a predetermined distance from the object.

17. The vehicle of claim 16, wherein the rear light is selected from at least one of tail lights, brake lights, and reversing lights.

18. The vehicle of claim 16, wherein the proximity indicator is a sticker or decal adhered to the rear window.

19. A vehicle comprising:
    a front end;
    a front window;
    a front light configured to project a light pattern onto an object in front of the front end; and
    a proximity indicator coupled to the front window at a predetermined position the proximity indicator is to align with the light pattern projected on the object when the front end is located a predetermined distance from the object.

20. The vehicle of claim 19, wherein the front light is selected from at least one of headlights, fog lights, and daytime running lights.

* * * * *